US012246325B2

(12) United States Patent
Sedlak et al.

(10) Patent No.: US 12,246,325 B2
(45) Date of Patent: *Mar. 11, 2025

(54) COLUMN TUBE HOLDER FOR IMPROVED-ACCURACY ASSAYS

(71) Applicant: Mercy BioAnalytics, Inc., Natick, MA (US)

(72) Inventors: Christopher Robert Sedlak, Framingham, MA (US); Joseph Charles Sedlak, Cambridge, MA (US); Laura Teresa Bortolin, Newtonville, MA (US); Daniel Parker Salem, Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,361

(22) Filed: Sep. 12, 2023

(65) Prior Publication Data

US 2023/0415161 A1 Dec. 28, 2023

Related U.S. Application Data

(62) Division of application No. 17/493,259, filed on Oct. 4, 2021, now Pat. No. 11,786,907.

(60) Provisional application No. 63/116,817, filed on Nov. 21, 2020.

(51) Int. Cl.

| | |
|---|---|
| ***B01L 9/06*** | (2006.01) |
| ***A47F 7/00*** | (2006.01) |
| ***A47F 7/28*** | (2006.01) |

(52) U.S. Cl.

CPC .............. *B01L 9/06* (2013.01); *A47F 7/0028* (2013.01); *A47F 7/283* (2013.01); *B01L 2300/12* (2013.01); *B01L 2300/16* (2013.01)

(58) Field of Classification Search

CPC .... B01L 9/06; B01L 2300/12; B01L 2300/16; B01L 2300/0832; B01L 2300/0854; B01L 2300/0858; A47F 7/0028; A47F 7/283; A47F 7/28; A47F 7/0021; A47F 81/007

USPC ................... 211/70.8, 85.18, 71.01; 206/446

See application file for complete search history.

(56) References Cited

U.S. PATENT DOCUMENTS 1,188,146 A * 6/1916 Bogley .................. A47B 73/00 211/74
1,634,953 A * 7/1927 McCune .................. B64D 1/02 211/74
2,902,170 A * 9/1959 Miller ....................... B01L 9/06 211/72
3,109,084 A * 10/1963 Walsh ....................... B01L 7/00 211/74
3,379,315 A * 4/1968 Broadwin ............. B01L 3/0217 422/933
3,474,913 A * 10/1969 Ingmar ..................... B01L 9/06 211/74

(Continued)

*Primary Examiner* — Jennifer E. Novosad
(74) *Attorney, Agent, or Firm* — Sullivan & Worcester LLP; Thomas C. Meyers

(57) ABSTRACT

A column tube holder includes: a first side rail extending vertically; a second side rail extending vertically; a first shelf extending horizontally between the first side rail and the second side rail; a second shelf extending horizontally between the first side rail and the second side rail, the second shelf disposed below the first shelf; and a third shelf extending horizontally between the first side rail and the second side rail, the third shelf disposed below the second shelf. The column tube holder is composed of a conductive material, an anti-static material, and/or a static dissipative material.

6 Claims, 9 Drawing Sheets

(56) References Cited

U.S. PATENT DOCUMENTS 3,604,566 A * 9/1971 Rem .................... B65D 25/108 211/74
3,759,538 A * 9/1973 Fabiano .................. B62B 3/102 280/47.35
3,762,594 A * 10/1973 Utz ...................... B65D 25/005 206/427
4,124,122 A * 11/1978 Emmitt ..................... B01L 9/06 422/561
4,273,416 A * 6/1981 Blum ........................ B01L 9/06 359/809
4,284,603 A * 8/1981 Korom ...................... B01L 9/06 210/473
4,403,687 A * 9/1983 Stevens .................. G01N 35/04 198/465.1
4,407,958 A * 10/1983 DeGraff, Jr. .............. B01L 9/06 422/549
4,453,639 A * 6/1984 Sharma ..................... B01L 9/06 422/561
4,895,650 A * 1/1990 Wang ........................ B01L 9/06 422/561
5,128,105 A * 7/1992 Berthold ................... B01L 9/06 422/65
5,133,939 A * 7/1992 Mahe ........................ B01L 9/06 211/74
5,141,117 A * 8/1992 Olsen .................... A47F 7/0028 211/74
5,169,603 A * 12/1992 Landsberger ............. B01L 9/06 211/74
5,456,360 A * 10/1995 Griffin ...................... B01L 9/06 206/443
5,632,388 A * 5/1997 Morrison .................. B01L 9/06 422/561
5,996,818 A * 12/1999 Boje ..................... A47F 7/0028 422/549
6,213,295 B1 * 4/2001 Hohn .................. A01M 31/004 220/741
6,568,544 B1 * 5/2003 Lafond ..................... B01L 9/06 211/74
6,851,563 B1 * 2/2005 Lipari ..................... A47F 7/283 211/74
7,017,741 B1 * 3/2006 Williamson .......... F17C 13/084 206/386
7,036,668 B2 * 5/2006 Udy ......................... B25H 3/04 211/60.1
7,191,904 B2 * 3/2007 Wescott, III .............. B01L 9/06 211/74
7,258,240 B2 * 8/2007 Wescott, III .............. B01L 9/06 211/74
D624,360 S * 9/2010 Leavelle ..................... D7/553.6
7,910,067 B2 * 3/2011 Knight ...................... B01L 9/06 422/562
D638,138 S * 5/2011 Wong ........................... D24/227
8,215,480 B2 * 7/2012 Qian .......................... B01L 9/06 211/85.13
8,246,919 B2 * 8/2012 Herchenbach ............ B01L 9/06 422/562
8,505,723 B2 * 8/2013 Clark ..................... B65D 5/503 206/443
8,591,838 B2 * 11/2013 Bulow ...................... B01L 9/06 422/562
8,757,400 B2 * 6/2014 Bosch ....................... B01L 9/06 211/74
9,144,801 B2 * 9/2015 Johnson .................... B01L 9/06
9,776,188 B1 * 10/2017 Kamees .................... B01L 9/50
D814,653 S * 4/2018 Shedlosky ................... D24/229
10,024,146 B2 * 7/2018 Duphorne ............... E21B 43/12
10,239,061 B2 * 3/2019 Weber-Hovendahl .... B01L 9/06
10,932,647 B1 * 3/2021 Audibert ............... A47L 15/505
10,993,532 B1 * 5/2021 Goldstein ............ A47B 47/042
11,083,295 B2 * 8/2021 Rapier ............... A47B 87/0207
11,786,907 B2 * 10/2023 Sedlak ...................... B01L 9/06 211/71.01
2002/0108917 A1 * 8/2002 Maruyama ................ B01L 9/50 211/74
2003/0017084 A1 * 1/2003 Dale .................... G01N 35/025 422/65
2005/0180895 A1 * 8/2005 Itoh ........................... B01L 9/06 422/400
2007/0235395 A1 * 10/2007 Mondale ................ A46B 17/00 211/65
2008/0075634 A1 * 3/2008 Herchenbach ............ B01L 9/06 422/400
2008/0206112 A1 * 8/2008 Fu ............................. B01L 9/06 422/400
2011/0274595 A1 * 11/2011 Ziegler ..................... B01L 9/06 422/562
2013/0026121 A1 * 1/2013 Thompson .............. A47J 47/16 211/85.18
2014/0140804 A1 * 5/2014 Focke ..................... B03C 1/288 422/562
2015/0108076 A1 * 4/2015 Branch ..................... B01L 9/06 422/562
2015/0336102 A1 * 11/2015 Tyagi ...................... B03C 1/288 414/800
2016/0096196 A1 * 4/2016 Papke .................. C09D 159/02 427/180
2018/0178219 A1 * 6/2018 Bazin ........................ B01L 9/06
2018/0290143 A1 * 10/2018 Cofano .............. G01N 35/1011
2019/0060909 A1 * 2/2019 Wardenburg ............. B01L 3/50
2021/0094037 A1 * 4/2021 An ............................ B01L 9/06
2022/0161265 A1 * 5/2022 Sedlak .................... A47F 7/283
2022/0176380 A1 * 6/2022 Courtney ................ B01L 9/543
2022/0186325 A1 * 6/2022 DeJohn ................ C12Q 1/6888
2023/0415161 A1 * 12/2023 Sedlak .................... A47F 7/283

* cited by examiner

COLUMN TUBE HOLDER FOR IMPROVED-ACCURACY ASSAYS

CROSS-REFERENCE TO RELATED APPLICATIONS

This application is a divisional of U.S. patent application Ser. No. 17/493,259, filed Oct. 4, 2021, which claims priority to and the benefit of U.S. Provisional Patent Application Ser. No. 63/116,817, filed Nov. 21, 2020, entitled "COLUMN TUBE HOLDER FOR IMPROVED-ACCURACY ASSAYS," the disclosure of which is incorporated herein by reference in its entirety.

FIELD

The subject matter described herein relates to apparatuses and systems for early detection of cancer and other diseases and more specifically to a column tube holder for improved-accuracy assays.

BACKGROUND

Early detection of cancer greatly increases the chance of successful treatment. However, many cancers still lack effective screening recommendations. Typical challenges for cancer-screening tests include limited sensitivity and specificity. A high rate of false-positive results can be of particular concern, as it can create difficult management decisions for clinicians and patients who would not want to unnecessarily administer (or receive) anti-cancer therapy that may potentially have undesirable side effects. Conversely, a high rate of false-negative results fails to satisfy the purpose of the screening test, as patients who need therapy are missed, resulting in a treatment delay and consequently a reduced probability of success.

Assays are often developed and utilized in early attempts to detect cancer. Assays themselves can introduce inaccuracies and sources of variation into the detection process. Column tube holders (for example, those used in connection with size-exclusion columns to purify extracellular vesicles from plasma) are often constructed of a polymer material or other material that allows for the build-up of localized electrical charges, which in turn can cause assay liquids such as samples, droplets, and analytes to adhere to the sidewalls of column tubes, receiving tubes, and/or reservoirs, due to the droplets of analytes being attracted to the localized electrical charges. The localized electrical charges attract or repel droplets of analyte as they fall from the column tubes, thereby causing the droplets to land on the sidewall or edges of the receiving tube, or in some cases causing the droplets to miss the receiving tube entirely.

SUMMARY

The present disclosed embodiments include assay equipment and systems for holding column tubes (for example size-exclusion columns used to purify extracellular vesicles from plasma, among others) that equalize the electrical forces acting on molecules and droplets, thereby enhancing the accuracy of assays and tests.

In one aspect, the present embodiments are directed to a column tube holder including: a first side rail extending vertically; a second side rail extending vertically; a first shelf extending horizontally between the first side rail and the second side rail; a second shelf extending horizontally between the first side rail and the second side rail, the second shelf disposed below the first shelf; and a third shelf extending horizontally between the first side rail and the second side rail, the third shelf disposed below the second shelf. The column tube holder includes a conductive material, an anti-static material, and/or a static dissipative material.

In some embodiments, the column tube holder is composed of copper, aluminum, nickel, graphene, brass, stainless steel, carbon steel, and/or titanium.

In some embodiments, the column tube holder includes a surface resistivity from about $1\times10^{-6}$ ohm/sq to about $1\times10^{9}$ ohm/sq.

In some embodiments, the column tube holder includes a conductivity from about $1.01\times10^{-8}$ (ohm-meters)$^{-1}$ to about $1.01\times10^{-4}$ (ohm-meters)$^{-1}$.

In some embodiments, the first shelf includes a first plurality of holes. The second shelf includes a second plurality of holes. The number of holes in the second plurality equals the number of holes in the first plurality. The third shelf includes a third plurality of holes. The number of holes in the third plurality of holes equals the number of holes in the second plurality of holes. The first plurality of holes, the second plurality of holes, and the third plurality of holes are vertically aligned.

In some embodiments, the column tube holder includes at least one pair of sidewalls extending vertically between the second shelf and the third shelf. A first sidewall of the at least one pair of sidewalls is disposed on the opposite side of a hole of the third plurality of holes from a second sidewall of the at least one pair of sidewalls.

In another aspect, the present embodiments are directed to a column tube holder including: a first side rail extending vertically; a second side rail extending vertically; a first shelf extending horizontally between the first side rail and the second side rail; a second shelf extending horizontally between the first side rail and the second side rail, the second shelf being disposed below the first shelf; a third shelf extending horizontally between the first side rail and the second side rail, the third shelf being disposed below the second shelf, the third shelf including at least one hole disposed therethrough; and at least two sidewalls extending vertically between the second shelf and the third shelf, each sidewall of the at least two sidewalls being disposed on opposing sides of the at least one hole.

In some embodiments, the column tube holder includes a base beneath the third shelf. Each of the first and second side rails are anchored into the base.

In some embodiments, the column tube holder is composed of a conductive material, an anti-static material, and/or a conductive material.

In some embodiments, each sidewall is equidistant from the hole.

In some embodiments, each sidewall is substantially planar.

In some embodiments, each sidewall includes a shape that is convex, concave, circular, and/or oval-shaped.

In some embodiments, the column tube holder includes at least one partial bottom wall extending adjacent to the third shelf. The partial bottom wall is aligned in the vertical plane.

In some embodiments, the column tube holder includes at least one partial top wall extending adjacent to the second shelf. The partial top wall is aligned in the vertical plane.

In another aspect, the present embodiments are directed to a system for holding column tubes including: a column tube holder including: a first side rail extending vertically; a second side rail extending vertically; a first shelf extending horizontally between the first side rail and the second side rail, the first shelf comprising a first plurality of holes disposed therethrough; a second shelf extending horizontally between the first side rail and the second side rail, the second shelf being disposed below the first shelf, the second shelf including a second plurality of holes disposed therethrough; and a third shelf extending horizontally between the first side rail and the second side rail, the third shelf being disposed below the second shelf, the third shelf including a third plurality of holes disposed therethrough; and at least one column tube disposed within at least one hole of the first plurality of holes and at least one hole of the second plurality of holes.

In some embodiments, the first plurality of holes, the second plurality of holes, and the third plurality of holes are vertically aligned.

In some embodiments, the system includes: at least one receiving container disposed beneath the third shelf; and at least two sidewalls extending vertically between the second shelf and the third shelf, each sidewall being disposed on opposing sides of at least one hole of the third plurality of holes. The liquid droplets from the column tube drop between the sidewalls into the receiving container.

In some embodiments, the receiving container includes a collector tube and/or a polystyrene liquid reservoir.

In some embodiments, the system includes a first section; a second section coupled via a first hinge to the first section; and a third section coupled via a second hinge to the second section.

In some embodiments, the column tube holder is composed of a conductive material, an anti-static material, and/or a conductive material.

In another aspect, the present embodiments are directed to a column tube holder for performing size-exclusion chromatography including: two vertical support members, and at least three horizontal shelves extending between the two vertical support members. The column tube holder is composed of conductive material.

In some embodiments, the column tube holder includes at least one hole disposed through each of the three horizontal shelves; and at least two sidewalls extending vertically between two of the horizontal shelves. The sidewalls are equidistant from the hole.

It should be understood that the order of steps or order for performing certain actions is immaterial as long as the present embodiments remains operable. Moreover, two or more steps or actions may be conducted simultaneously.

The following description is for illustration and exemplification of the disclosure only, and is not intended to limit the present disclosure to the specific embodiments described.

The mention herein of any publication, for example, in the Background section, is not an admission that the publication serves as prior art with respect to any of the present claims. The Background section is presented for purposes of clarity and is not meant as a description of prior art with respect to any claim.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended figures, in which.

DESCRIPTION OF CERTAIN ASPECT OF THE DISCLOSED EMBODIMENTS

Figure 1:
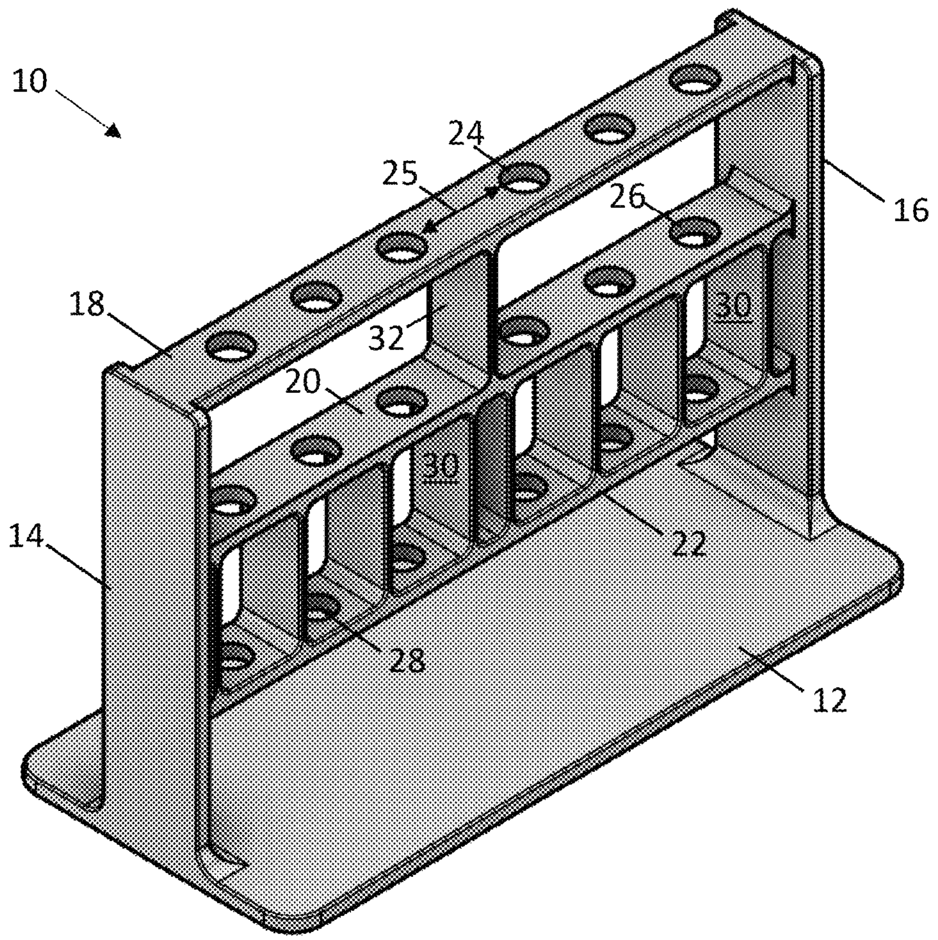
FIG. 1 illustrates a perspective view of a column tube holder, according to aspects of the present embodiments.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

The present disclosed embodiments include apparatuses and systems for preventing assay analytes from accumulating on the sidewalls of column tubes and/or receiving tubes (or collector tubes), due to the localized accumulation of electrical charges. The present embodiments may include a column tube holder constructed of materials that are at least partially conductive to eliminate or minimize the build-up of localized charges. In addition, the column tube holder of the present embodiments may include structural elements such as sidewalls surrounding the vessels and tubes to help balance out the distribution of charges equally. The present embodiments may be used in connection with size-exclusion assays in which components of a particular size are separated from a mixture via the column tubes.

In some embodiments in which size exclusion of the sample or analyte is desired, such a sample may be subjected to size-exclusion-based purification or filtration. Various size-exclusion-based purification or filtration techniques are known in the art, and those skilled in the art will appreciate that in some cases, a sample may be subjected to size-exclusion purification based on specific particle size cutoff. Those skilled in the art will also appreciate that appropriate particle size cutoff for purification purposes can be selected, e.g., based on the size of the entity of interest (e.g., a biological entity such as extracellular vesicle). For example, in some embodiments, size-exclusion separation methods may be applied to samples comprising extracellular vesicles to isolate a fraction of extracellular vesicles that are of a certain size (e.g., 30 nm-1000 nm). In some embodiments, size-exclusion separation methods may be applied to samples comprising extracellular vesicles to isolate a fraction of extracellular vesicles that are greater than 70 nm and no more than 200 nm. In other embodiments, other sized extracellular vesicles may be separated. The column tube holder of the present embodiments may be used in connection with assays that include size exclusion via column-tube filtration, as disclosed herein. The present embodiments may also be utilized in other applications other than size-exclusion-based filtration (for example, in any application in which minimizing or eliminating localized charges is desired).

FIG. 1 illustrates a column tube holder 10, according to aspects of the present embodiments. The column tube holder 10 may include a base 12, a first side rail 14 extending vertically from the base 12, and a second side rail 16 also extending vertically from the base 12. The first and second side rails 14, 16 (i.e., "vertical support members") support a first shelf 18, a second shelf 20, and a third shelf 22. Each of the first, second, and third shelves 18, 20, 22 extends horizontally between the first and second side rails 14, 16, and contains a plurality of holes disposed therethrough for holding column tubes and regular tubes and/or for allowing droplets of analyte and/or other liquids to drip therethrough. For example, each of the first, second, and third shelves 18, 20, 22 may include 2, 4, 6, 8, 10, 12, 14, 16, 18, 20, or some other number of holes disposed therethrough. In the embodiment of FIG. 1, each of the first, second, and third shelves 18, 20, 22 includes 6 holes (i.e., six (6) first holes 24 disposed within the first shelf 18, six (6) second holes 26 disposed within the second shelf 20, and six (6) third holes 28 disposed within the third shelf 22). The first shelf 18 (for example, the "top shelf") may be disposed vertically above the second shelf 20 (for example, the "middle shelf"), which may be disposed vertically above the third shelf 22 (for example, the "bottom shelf"), which itself may be disposed vertically above the base 12. The first holes 24 (for example, the first plurality of holes) disposed within the first shelf 18, the second holes 26 (for example, the second plurality of holes) disposed within the second shelf 20, and the third holes 20 (for example, the third plurality of holes) disposed within the third shelf 22 may all be vertically aligned with one another to allow column tubes and/or collector tubes to be disposed therethrough. In some embodiments, each of the third holes 28 may include a larger diameter than the second holes 26 to minimize the likelihood that droplets will contact a surface (for example, the third shelf 22) as they fall. In some embodiments, the third holes 28 may also be a smaller diameter than the second holes 26. Embodiments that include third holes 28 with a larger or smaller diameter than that of the second holes 26 may also be used to accommodate different collector tube diameters. In the embodiment of FIG. 1, the column tube holder 10 may include a gap 25 between a first group of the first holes 24 and a second group of first holes 24. In this embodiment, the column tube holder 10 includes similar gaps between first and second groups of second holes 26 and third holes 28. In other embodiments, each of the groups of first, second, and third holes 24, 26, 28 may be equally spaced from each other.

Figure 5:
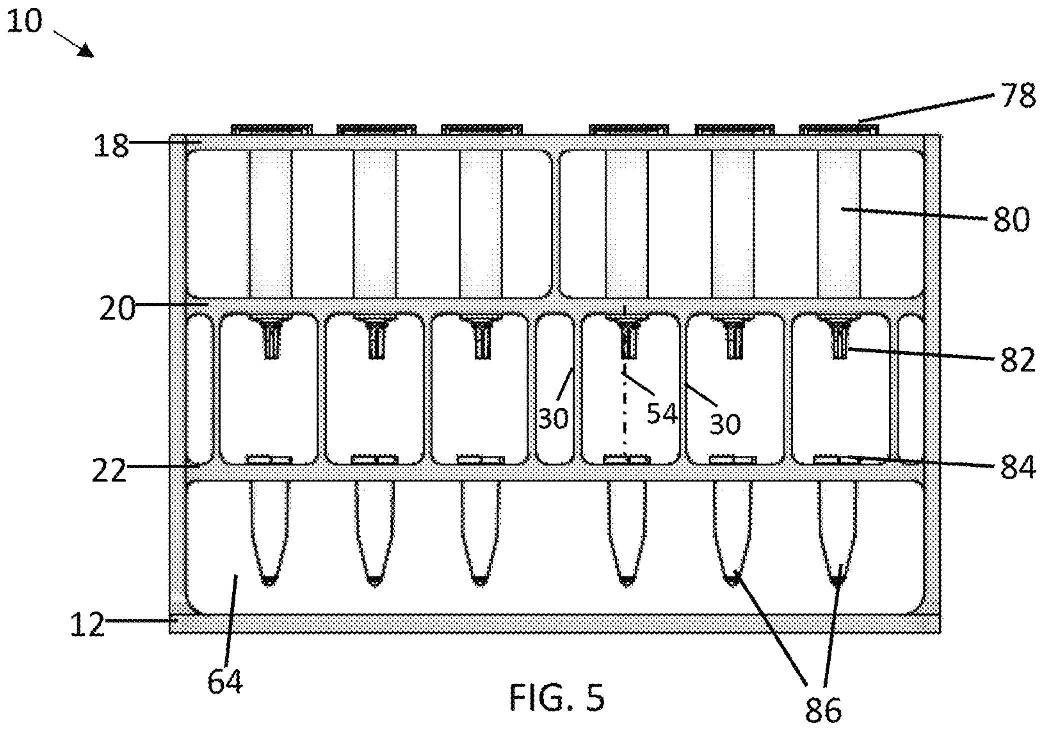
FIG. 5 illustrates a front view of the column tube holder holding column tubes and collector tubes, according to aspects of the present embodiments.
Figure 6:
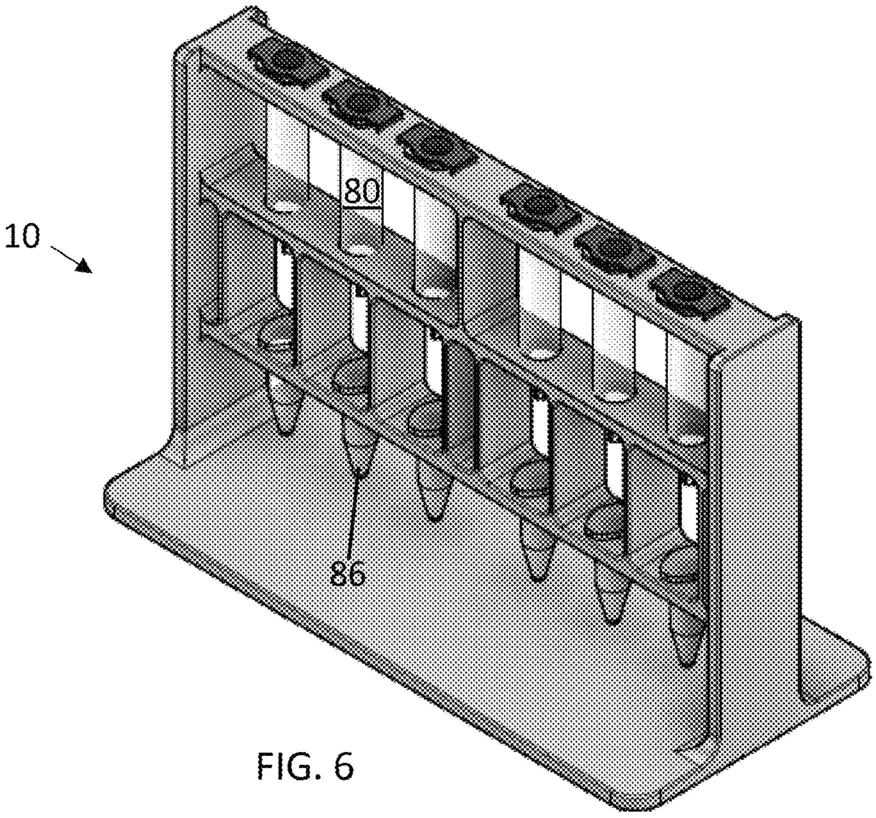
FIG. 6 illustrates a perspective view of the column tube holder holding column tubes and collector tubes, according to aspects of the present embodiments.

Referring still to FIG. 1, the column tube holder 10 may include a plurality of sidewalls extending vertically between the second shelf 20 and the third shelf 22. The column tube holder may hold a plurality of column tubes 80 (shown in FIGS. 5-9) within the first holes 24 in the first shelf 18 and the second holes 26 in the second shelf 20. (FIGS. 5 and 6 illustrate a column tube holder 10 holding column tubes 80 and collecting tubes 86). The column tube holder 10 may also include a plurality of receiving tubes (or collector tubes) or receptacles between the base 12 and the third shelf 22 for receiving droplets from the column tubes above. As droplets are filtered from the column tubes, they drop between the second shelf 20 and the third shelf 22 between the sidewalls 30, which help to balance out the electrical charge acting on the droplets, thereby allowing them to fall through the third holes 28 and into the receiving container, assuming that 1) the sidewalls 30 are equidistant from the holes 26, 28, and 2) the column tube holder 10 is composed of conductive, static dissipative, and/or anti-static material. The column tube holder 10 may also include a middle support wall 32 vertically extending between the second shelf 20 and the first shelf 18, thereby providing enhanced support and rigidity to the first shelf 18.

Still referring to FIG. 1, the column tube holder 10 may be composed of conductive, static dissipative, and/or anti-static material. As defined herein, conductive materials are those with a surface resistivity of from about $1\times10^{-6}$ ohm/sq to about $1\times10^{4}$ ohm/sq; static dissipative materials are those with a surface resistivity of from about $1\times10^{4}$ ohm/sq to about $1\times10^{9}$ ohm/sq; and anti-static materials are those with a surface resistivity from about $1\times10^{9}$ ohm/sq to about $1\times10^{11}$ ohm/sq. By contrast, insulators may be defined as materials with a surface resistivity of about $10^{12}$ ohm/sq and higher. As such, the column tube holder 10 may be composed of materials with a surface resistive of from about $10^{-6}$ (and lower) ohm/sq to about $10^{11}$ ohm/sq. In some embodiments, the surface resistivity of the column tube holder 10 may be less than about $10^{8}$ ohm/sq, less than about $10^{7}$ ohm/sq, less than about $10^{6}$ ohm/sq, less than about $10^{5}$ ohm/sq, and/or less than about $10^{4}$ ohm/sq. At surface resistivities greater than about $1\times10^{4}$ ohm/sq, localized charge can build-up. However, as long as the surface resistivity is less than or equal to about $1\times10^{11}$ ohm/sq, the localized charge build-up will be relatively small. With anti-static and/or static dissipative materials, once localized charge reaches a high enough threshold, the charge will begin to distribute itself across the surface, due to the inherent material properties of the column tube holder 10. As such, due to the geometry of the column tube holder 10, the effects of localized charges acting on the droplets can be minimized, even with anti-static and/or static dissipative materials. However, in many embodiments, conductive materials are likely to be preferred to both anti-static and static dissipative materials.

Referring still to FIG. 1, the column tube holder 10 may be composed of materials such as metals (including, for example, aluminum, copper, nickel, brass, stainless steel, carbon steel, titanium, and alloys thereof such as aluminum oxide), graphene, carbons, some polymer materials, and some composite materials. In some embodiments, the column tube holder 10 may be composed of or include aluminum 6061-T6 and/or other aluminum varieties such as alloy 1100 (A91100), alloy 2024, alloy 7075, and alloy 3560. In other embodiments, the column tube holder may be composed or include stainless steel varieties such as stainless-steel alloy 304, stainless-steel alloy 316, stainless-steel alloy 405, stainless-steel alloy 440A, and/or stainless-steel alloy 17-7PH. In other embodiments, the column tube holder may be composed of or include copper alloys such as C11000, C17200, C26000, C36000, and/or C71500. Other suitable non-insulator materials may also be used. In some embodiments, the column tube holder 10 may include an insulator material coated with a continuous conductive or anti-static coating covering the entire periphery of the column tube holder 10. As such, the column tube holder 10 may be composed of materials that help to evenly distribute any electrical charges that accumulate on the column tube holder 10, thereby avoiding large variation in localized built-up electrical charges. In embodiments that include a coating, the coating may include a surface resistivity less than about 10^8 ohm/sq, less than about 10^7 ohm/sq, less than about 10^6 ohm/sq, less than about 10^5 ohm/sq, and/or less than about 10^4 ohm/sq. Expressed in terms of conductivity, in some embodiments the coating and/or the material of the column tube holder 10 may have a conductivity of about 1.01×10^4 (ohm-meters)^−1, or from about 1.01×10^−8 (ohm-meters)^−1 to about 1.01×10^−4 (ohm-meters)^−1, or from about 1.01×10^−7 (ohm-meters)^−1 to about 1.01×10^4 (ohm-meters)^−1, or from about 1.01×10^−6 (ohm-meters) ^−1 to about 1.01×10^4 (ohm-meters)^−1, or from about 1.01×10^−4 (ohm-meters)^−1 to about 1.01×10^4 (ohm-meters)^−1, or from about 1.01×10^−4 (ohm-meters)^−1 to about 1.01×10^4 (ohm-meters)^−1, or from about 1.01×10^−2 (ohm-meters)^1 to about 1.01×10^3 (ohm-meters)^−1, or from about 1.01×10^−1 (ohm-meters)^−1 to about 1.01×10^4 (ohm-meters)^−1, or from about 1.01×10^−1 (ohm-meters)^−1 to about 1.01×10^5 (ohm-meters)^−1, as well as other subranges therebetween.

With no localized charges accumulating on the column tube holder 10, droplets may fall from the column tubes into the receiving containers, without being attracted to one side or the other, and without adhering to the sidewalls of any tube or the holder itself. The column tube holder 10 may include a homogenous composition such that there is little spatial variation in material properties throughout the column tube holder 10. For example, in some embodiments, both the conductivity and the surface resistivity vary spatially by less than 5%, while in other embodiment, both the conductivity and the surface resistivity vary spatially by less than 1%.

Referring still to FIG. 1, in an exemplary demonstration using a column tube holder composed of insulator material, a permanent conductor metallic wire was grounded at one end, and then brought into contact with the localized charge area on the column tube holder composed of insulator material. Although the grounded metallic wire was effective in temporarily eliminating localized charge from the column tube holder composed of insulator material, the localized charge(s) built back up again within about one (1) minute of removing the metallic wire from the column tube holder (i.e., within about one (1) minute of "ungrounding" the column tube holder). Therefore, by avoiding insulator materials in the composition of the column tube holder localized electrical charge build-ups can be avoided and/or minimized.

Still referring to FIG. 1, the sidewalls 30 of the column tube holder 10 help to balance out any electromagnetic or electrostatic forces acting on droplets of analyte or sample as they fall vertically from the second shelf 20 to the third shelf 22. The sidewalls 30 also help to prevent splashing from one receiving tube 84 to another receiving tube 84. The amplitude of the force acting on each droplet may be approximated via Coulomb's Law: F=(q1*q2)/(r^2), where F is the force; q1 is representative of the accumulated charge within each droplet; q2 is representative of the localized charge or charges accumulated within column tube holder 10, and r is the radius or distance between the droplet and the accumulated charge within the column tube holder 10. As such, the force acting on the droplets is inversely proportional to the square of the distance between the droplet and the accumulated charge within the column tube holder 10. By placing the sidewalls approximately equidistance on either side of the desired vertical path through which the droplets are expected to fall, the force can be balanced out. Stated otherwise, because the electrical charge is expected to be substantially evenly distributed throughout the surface of the column tube holder and because the sidewalls are approximately equally-sized and equally spaced on opposing sides of the vertical path through which each droplet falls, the force acting on each droplet from one wall is balanced by the force acting on the droplet from the opposing wall. As a result, the net force acting on the droplet causes the droplet to be attracted to neither of the walls, and the droplet simply falls vertically downward into the receiving container. Because Coulomb's Law illustrates that the force acting on each droplet is inversely proportional to the square of the distance, the two walls on either side of the droplet are likely to have the greatest effect on the net force acting on the particle since they are the closest structures to the droplets as they fall, with the charges from other sidewalls and structures of the column tube holder 10 having a much smaller effect. The geometric layout of the column tube holder 10 including sidewalls 30 on either side of the droplet path, as well as the conductive, static dissipative, and/or anti-static material from which the column tube holder 10 is composed, both help to ensure that the net force acting on the droplets is minimized, thereby increasing the accuracy of the assay.

Figure 2:
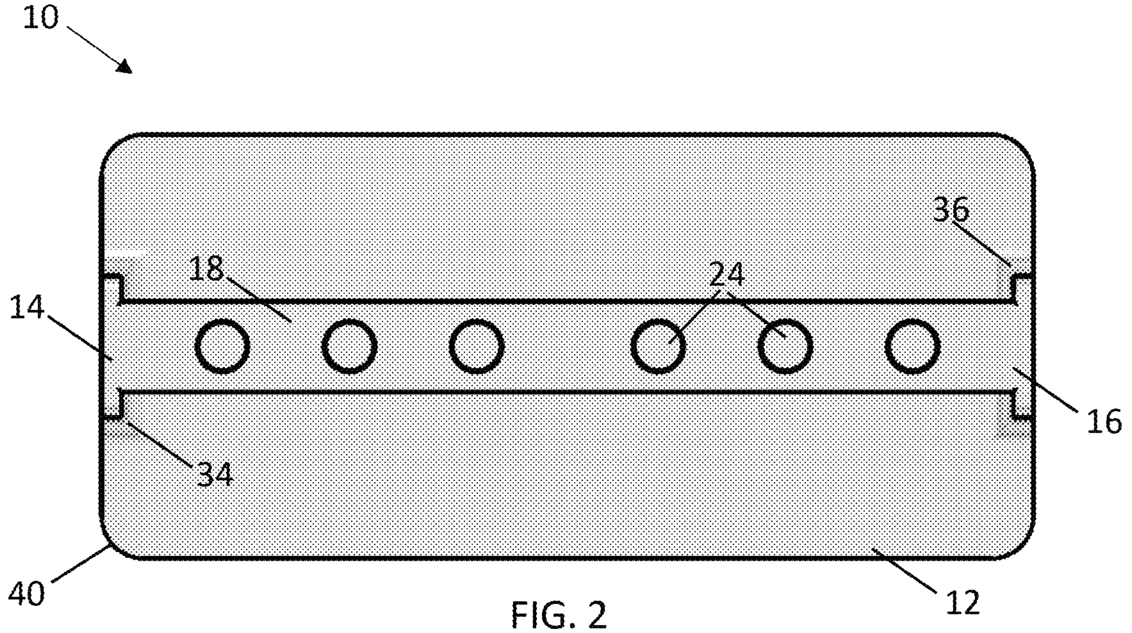
FIG. 2 illustrates a top view of a column tube holder, according to aspects of the present embodiments.

FIG. 2 illustrates a top view of the column tube holder 10, according to aspects of the present disclosed embodiments. The column tube holder 10 includes the base 12, the first and second side rails 14, 16, the first shelf 18, and the plurality of first holes 24. The column tube holder 10 also includes the additional features of FIG. 1, though they are not visible in FIG. 2. The column tube holder 10 may include a first transition 34 that forms a gradual transition between the first side rail 14 and the base 12, as well as a second transition 36 that forms a gradual transition between the second side rail 16 and the base 12. Each of the first and second transitions 34, 36 may include a local thickening to enhance the robustness of the joint between the respective first and second side rails 14, 16 and the base 12, thereby anchoring each of the first and second side rails 14, 16 to the base 12. The column tube holder 10 may also include chamfers and/or fillets 40 around the corners of the base 12, which may be substantially rectangular with a length that is from about 1.5 to about 3.5 times the width, or from about 2 to about 3 times the width, or from about 2.2 to about 2.8 times the width, or about 2.5 times the width. The column tube holder may be fabricated or formed via additive manufacturing (for example via 3D printing methods such as selective laser sintering (SLS), selective laser melting (SLM), direct metal laser sintering (DMLS), direct metal laser melting (DMLM), and other 3D printing modalities), investment casting, CNC machining, or formed in segments (for example, sheet metal, lathed, and/or milled parts) that are then joined together via welding (such a MIG welding, tack welding, arc welding, and/or friction-stir welding), soldering, fusing, brazing, and/or other joining processes that include a conductive, antistatic, and/or static dissipative joining material.

A column tube holder 10 formed via additive manufacturing, CNC machining, and/or investment casting will likely result in the column tube holder being monolithic, (that is having continuous and/or homogenous material properties throughout its entire structure). A column tube holder 10 formed in segments that are then joined together may not be monolithic, but may nevertheless include sufficient strength throughout, as well as sufficient surface conductivity and/or static dissipation such that it may function according to the present disclosure.

Figure 3:
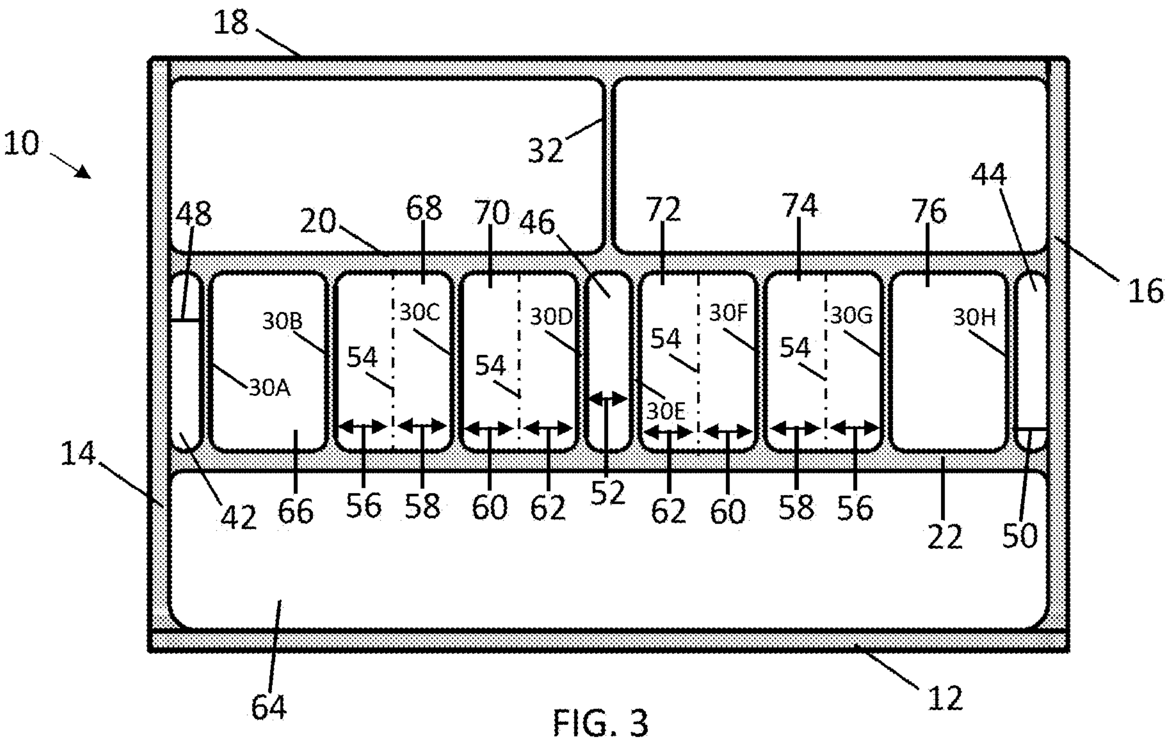
FIG. 3 illustrates a front view of a column tube holder, according to aspects of the present embodiments.

FIG. 3 illustrates a front view of the column tube holder 10, according to aspects of the present disclosed embodiments. The column tube holder 10 as illustrated in FIG. 3 includes the first, second, and third shelves 18, 20, 22, the base 12, the side rails 14, 16, and the middle support wall 32. The first, second, and third pluralities of holes 24, 26, 28 are also present in the column tube holder 10 of FIG. 3, despite not being visible in the front view of FIG. 3. The plurality of sidewalls 30 includes eight (8) individual sidewalls 30A, 30B, 30C, 30D, 30E, 30F, 30G, and 30H, as shown in FIG. 3. The eight (8) individual sidewalls 30A-30H define six (6) individual spaces 66, 68, 70, 72, 74, 76 through which the assay droplets may fall. For example, sidewalls 30A and define space 66 while sidewalls 30G and 30H define space 76 (and similarly for the other sidewalls and spaces). In other embodiments, the column tube holder 10 may include other numbers of first, second, and third pluralities of holes 24, 26, 28, and as a result, other numbers of sidewalls 30A-30H and spaces 66, 68, 70, 72, 74, 76. A centerline 54 of each of the second holes 26 also acts as the centerline for each of the corresponding third holes 28 (since they are vertically aligned), as illustrated in the second, third, fourth, and fifth spaces 68, 70, 72, 72. The column tube holder 10 would also include a similar centerline 54 in the first and sixth spaces 66, 76, though it is not illustrated in FIG. 3. Each of the centerlines 54 also represent the desired path through which the analyte droplets will fall such that they travel though the third plurality of holes 28. In some embodiments, the base 12 may be thicker than the sidewalls 30, side rails 14, 16, and first, second, and third shelves 18, 20, 22 in order to make the base 12 heavier, thereby reducing the likelihood that the column tube holder 10 will be inadvertently knocked over. In other embodiments, the base 12 may include a thickness that is approximately the same as the other structures of the column tube holder 10.

Referring still to FIG. 3, a first spacing 56 is defined as the distance between sidewall and centerline 54. The first spacing 56 may also be defined as the distance between sidewall and center 54. Similarly, a second spacing 58 is defined as the distance between sidewall and centerline 54 (in the second space 68). The second spacing 58 may also be defined as the distance between sidewall 30F and centerline 54 (in the fifth space 74). Similarly, a third spacing 60 is defined as the distance between sidewall 30C and centerline 54 (in the third space 70). The third spacing 60 may also be defined as the distance between sidewall 30F and centerline 54 (in the fourth space 72). Similarly, a fourth spacing 62 is defined as the distance between sidewall and centerline 54 (in the third space 70). The fourth spacing 62 may also be defined as the distance between sidewall 30E and centerline 54 (in the fourth space 72). In order to keep the sidewalls surrounding each space (and each droplet path) equidistant from the centerline 54, the first and second spacings 56, 58 should be approximately equal while the third and fourth spacings should also be approximately equal. As such, any electrical charge accumulated in a sidewall that is acting on the droplets will be cancelled out by an equal and opposite force from charges that have accumulated in the opposing sidewalls (since, in the case that conductive materials are used for the column tube holder 10, the sidewalls and structures thereof will act to evenly distribute any charges across the entire surface of the column tube holder 10; in the case of static dissipative and/or anti-static materials, there may be some localized charge buildup before the charge overflows and spreads to other areas of the surface, though not as evenly as it does in the case of conductive materials).

Still referring to FIG. 3, in some embodiments the column tube holder 10 may be "calibrated" by positioning the sidewalls slightly closer or further away from the centerline 54 as necessary to account for electrical charges on structures other than the 2 sidewalls immediately surrounding each centerline 54 (i.e., to balance out chargers on those other structures). For example, because the centerline 54 in space 70 is not exactly in the center of the entire column tube holder 10 (i.e., space 70 is slightly to the left of the center of the column tube holder 10), there are more structures to the right of space 70 than to the left of space 70. As such, in some embodiments, sidewall 30C may be located slightly closer to center line 54 than sidewall 30D to balance the overall forces and charges acting on droplets falling through space 70 (i.e., third spacing 60 is smaller than fourth spacing 62). Similarly, space 74 is located toward the right side of the column tube holder 10 and therefore in some embodiments, sidewall 30G may be slightly closer to the centerline 54 in space 74 than sidewall 30F is (i.e., first spacing 56 is smaller than second spacing 58). In embodiments in which one sidewall is closer to the centerline 54 within a given space than the opposing sidewall, the closer sidewall may be from about 0.1% to about 1% closer, from about 1% to about 5% closer, from about 5% to about 10% closer, from about 10% to about 20% closer, from about 15% to about 25% closer, from about 0.5% to about 25% closer, from about 1% to about 20% closer, from 2% to about 15% closer, and/or from about 5% to about 10% closer. Each centerline 54 is defined as intersecting the respective centers of each of the second holes 26 and each of the third holes 28. Each of the centerlines 54 may be oriented such that they are within about 5 degrees, within about 2 degrees, within about 1 degree, and/or within about half of a degree from a vertical direction.

Referring still to FIG. 3, the column tube holder 10 may include first and second side spaces 42, 44, in order to adjust an overall width of the column tube holder 10 (for example, in order to accommodate fluid receptacles and/or reservoirs within bottom space 64, which is defined above the base 12, below the third shelf 22, and between the first and second side rails 14, 16). The column tube holder 10 may also include a center space 46 to allow space for the middle support wall 32 in the center of the column tube holder 10 such that the middle support wall 32 does not interfere with any of the column tubes. A center space width 52 may be approximately the same size as the first and second side space widths 48, 50. In other embodiments, the center space width 52 may be within about 1%, about 2%, about 5%, about 10%, about 20%, about 50%, and/or more than 50% of the first and second side space widths 48, 50.

Figure 4:
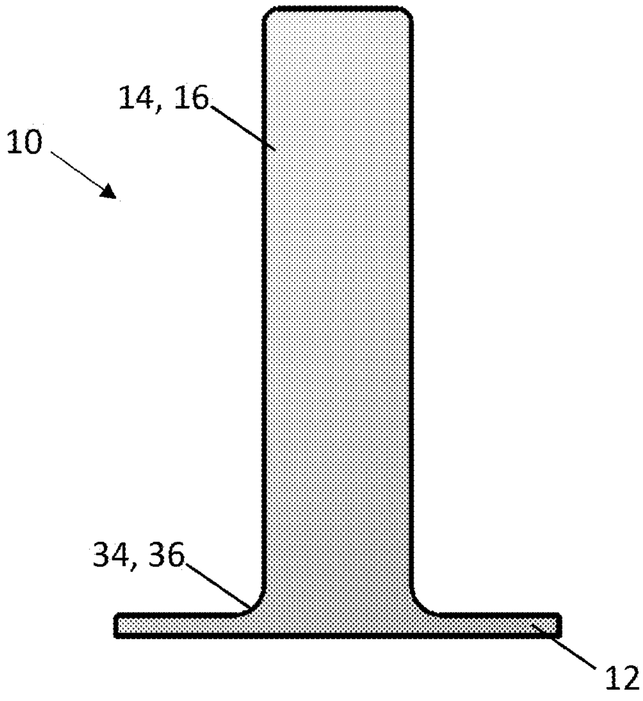
FIG. 4 illustrates a side view of a column tube holder, according to aspects of the present embodiments.

FIG. 4 illustrates a side view of the column tube holder 10 including the first and second side rails, 14, 16 the base 12, and the first and second transitions 34, 36 from the base 12 to the respective first and second side rails 14, 16.

FIG. 5 illustrates a front view of the column tube holder 10, according to aspects of the present embodiments. In the embodiment of FIG. 5, the column tube holder 10 is holding a plurality of column tubes 80, as well as a plurality of collector tubes 86 for receiving droplets from the each of the column tubes 80. Each of the column tubes 80 may include various size exclusion column tubes (for example, size-exclusion chromatography columns) and may extend between the first shelf 18 and the second shelf 20 within the respective first and second holes 24, 26 (shown in FIG. 1). Each of the column tubes 80 may include a cap 78 located at the top of the column tube 80 to hold the column tube 80 in place and to prevent the column tube 80 from falling through the respective first hole 24 into which it is placed. Each column tube 80 may also include a stopper 82 disposed at the bottom of the column tube 80 to temporarily or permanently prevent liquid from flowing through. Each column tube 80 may also include a size-exclusion resin contained therewithin, which prevents molecules and/or droplets of a certain size from passing through the column tube 80. As the droplets fall from the column tubes 80 to the collector tubes 86, the sidewalls 30 (in connection with the conductive, antistatic, and/or charge dissipative material of the column tube holder, which helps to evenly distribute any charges across the entire surface) help to ensure that the droplets are not attracted to the sidewalls 30, and/or any other charged surface. Each of the collector tubes 86 may hang from the third shelf 22 down into the bottom space 64. In addition, each of the collector tubes 86 may also include a flange 84 to prevent the collector tubes 86 from falling through the respective third holes 28 (shown in FIG. 1). The collector tubes 86 may include a capacity of about 5 mL, or from about 3 mL to about 7 mL, or from about 1 mL to about 10 mL, or from about 600 microliters (μL) to about 10 mL, or from about 300 μL to about 10 mL, or from about 100 μL to about 10 mL, or from about 100 μL to about 1 mL, and various other subranges therebetween.

FIG. 6 illustrates a perspective view of the column tube holder 10 holding column tubes and collector tubes 86, according to aspects of the present embodiments.

Figure 7:
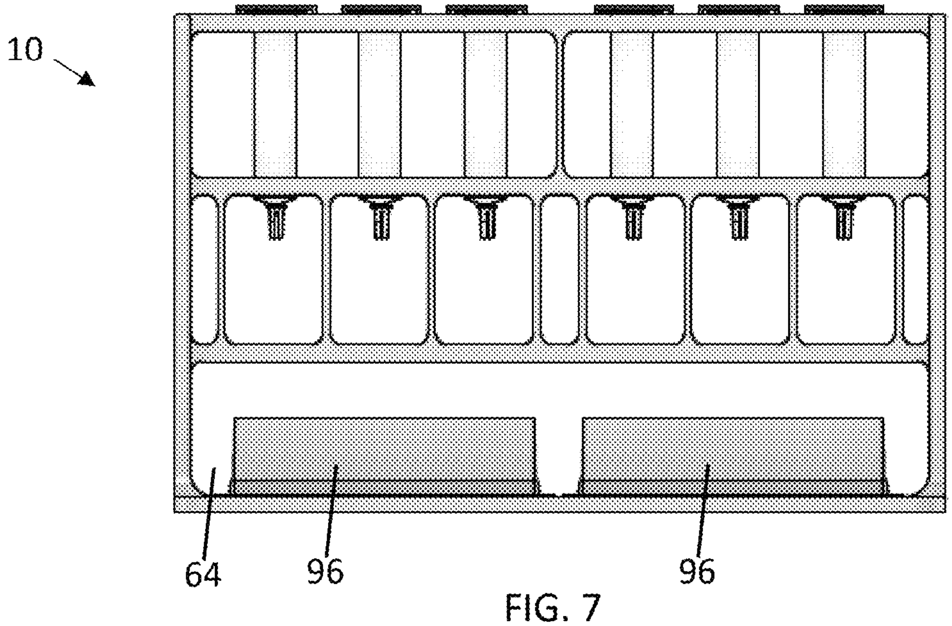
FIG. 7 illustrates a front view of the column tube holder with polystyrene liquid reservoirs, according to aspects of the present embodiments.
Figure 8:
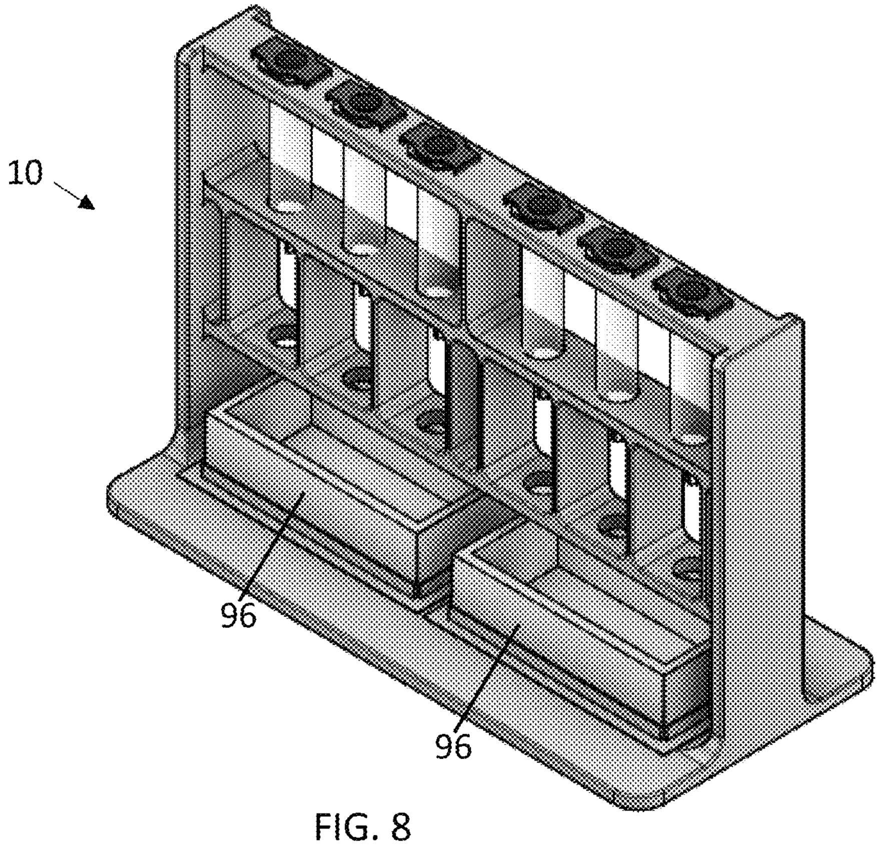
FIG. 8 illustrates a perspective view of the column tube holder with polystyrene liquid reservoirs, according to aspects of the present embodiments.

FIGS. 7 and 8 illustrate front and perspective views of the column tube holder 10 with polystyrene liquid reservoirs 96 rather than collector tubes 86, according to aspects of the present embodiments. The embodiments of FIGS. 7 and 8 include 2 polystyrene liquid reservoirs 96. However, in other embodiments, other numbers of polystyrene liquid reservoirs 96 are possible including 1, 3, 4, 5, 6, and/or more than 6 polystyrene liquid reservoirs 96, according to aspects of the present embodiments. The polystyrene liquid reservoirs 96 may be composed of any suitable materials including but not limited to polystyrene, polymer materials, composite materials, thermoplastic materials, ceramics, metallic materials, and/or other suitable materials. The bottom space 64 (and the column tube generally) may be sized such that standard 100 mL polystyrene liquid reservoirs 96 fit therewithin.

Figure 9:
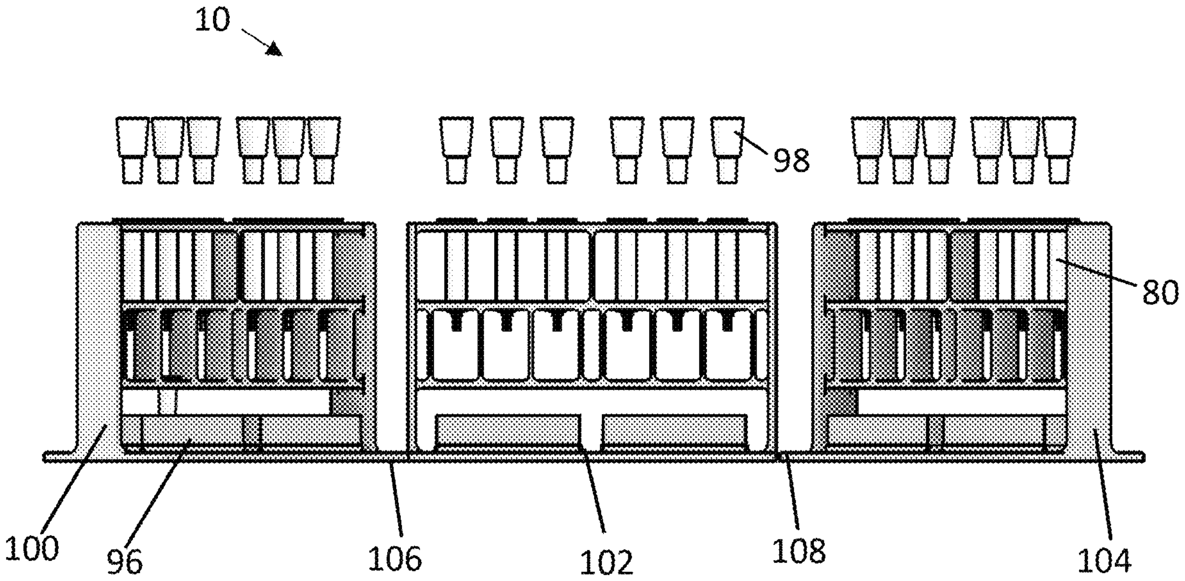
FIG. 9 illustrates an embodiment of the column tube holder including a first section, a second section, and a third section, according to aspects of the present embodiments.

FIG. 9 illustrates an embodiment of the column tube holder 10 including a first section 100, a second section 102, and a third section 104, according to aspects of the present embodiments. The first and second sections 100, 102 may be hingedly coupled via a first hinge 106, while the second and third sections 102, 104 may be hingedly coupled via a second hinge 108. Each of the first, second, and third sections 100, 102, 104 may include an embodiment of the column tube holder 10 according to any aspect described herein (i.e., any of FIGS. 1-8 and/or 10-18). FIG. 9 also illustrates one or more funnels 98 that may interface and couple to each of the column tubes 80 to allow analyte to more easily be poured or otherwise transferred into the column tubes 80. The column tube holder 10 of FIG. 9, including the first, second, and third sections 100, 102, 104 may be dimensioned such that it is able to fit in a standard biological safety cabinet.

Figure 10:
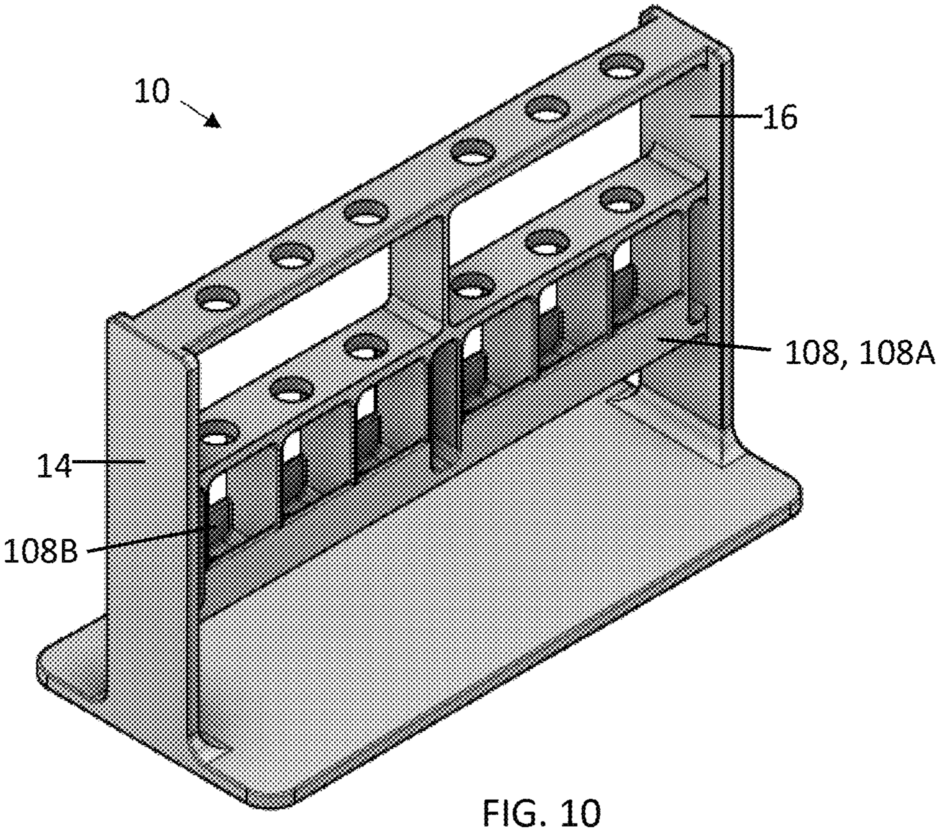
FIG. 10 illustrates a perspective view of a column tube holder including a partial bottom wall, according to aspects of the present embodiments.

FIG. 10 illustrates a column tube holder 10 including a partial bottom wall 108 extending from the first side rail 14 to the second side rail 16 adjacent the third shelf 22 (shown in FIG. 1) and oriented in the vertical plane, according to aspects of the present embodiments. The partial bottom wall 108 may include a first partial bottom wall 108A extending along the front side of the column tube holder 10, as well as a second partial bottom wall 108B extending along the back side of the column tube holder 10, such that the first and second partial bottom walls 108A, 108B even out the electrical forces acting on droplets falling from the column tubes 80 to the polystyrene liquid reservoirs 96 and/or collector tubes 86 (shown in FIGS. 5, 6, 7, 8, and/or 9).

Figure 11:
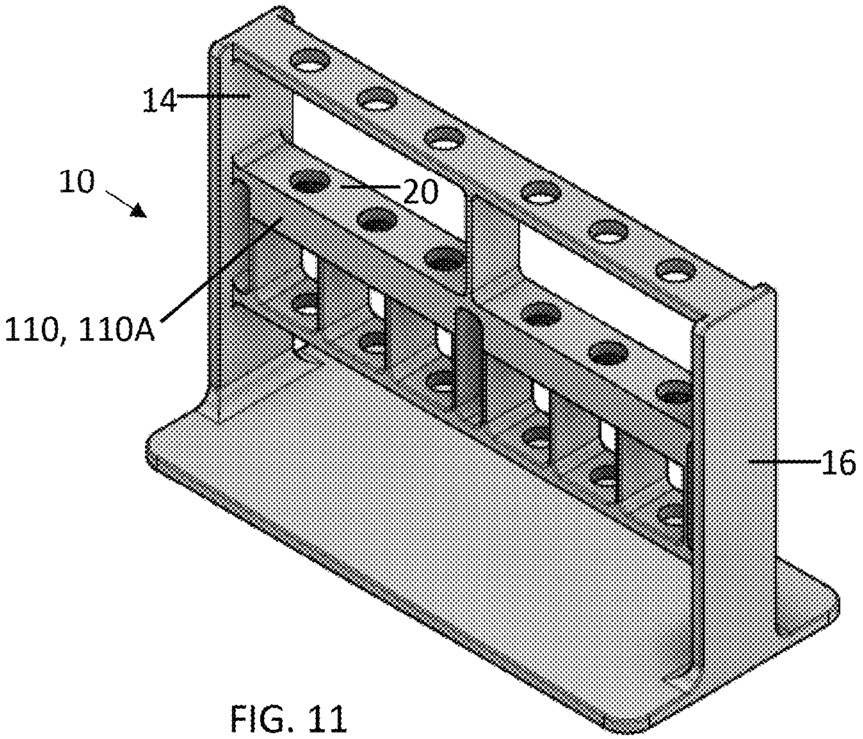
FIG. 11 illustrates a perspective view of a column tube holder including a partial top wall, according to aspects of the present embodiments.

FIG. 11 illustrates a column tube holder 10 including a partial top wall 110 extending from the first side rail 14 to the second side rail 16 adjacent the third shelf 20 and oriented in the vertical plane, according to aspects of the present embodiments. The partial top wall 110 may include a first partial top wall 110A extending along the front side of the column tube holder 10, as well as a second partial top wall 110B (not shown) extending along the back side of the column tube holder 10, such that the first and second partial top walls 110A, 110B even out the electrical forces acting on droplets falling from the column tubes 80 to the polystyrene liquid reservoirs 96 and/or collector tubes 86 (shown in FIGS. 5, 6, 7, 8, and/or 9). The embodiments of FIGS. 10 and 11 include the partial bottom wall 108 and the partial top wall 110, which can help to even out forces in a longitudinal direction (i.e., a direction oriented from the front of the column tube holder to the back of the column tube holder 10) to aid the sidewalls 30 (shown in FIGS. 1, 3, and 5), which help to balance out the electrical forces acting on the droplets in a lateral direction (i.e., from the left side to the right of the column tube holder 10).

Figure 12:
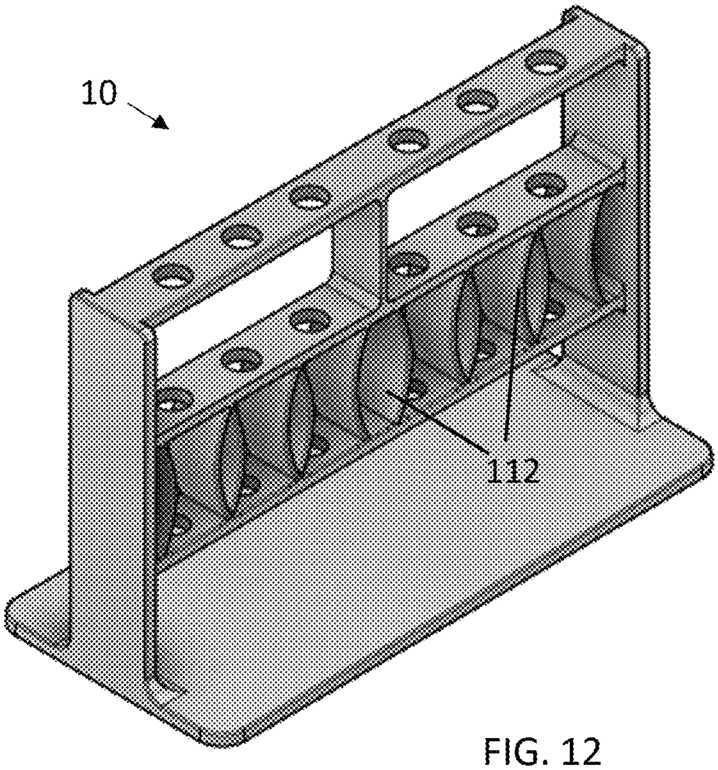
FIG. 12 illustrates a perspective view of a column tube holder with convex sidewalls, according to aspects of the present embodiments.

FIG. 12 illustrates a column tube holder 10 with convex sidewalls 112, according to aspects of the present embodiments. The convex sidewalls 112 are convex from the perspective of the centerline 54 and/or holes 26, 28. Although each of the convex sidewall 112 of the embodiment of FIG. 12 include a varying distance to a centerline 54 (shown in FIGS. 3 and 5), they are equally spaced (or approximately equally spaced (for example, within about 1%, 5%, 10%, etc.)) from the centerline 54 with the opposing convex sidewall 112, for a given height. Stated otherwise, at a given height, the centerline 54 is approximately equally spaced from each of the two opposing convex sidewalls 112. Thus, even with embodiments of the column tube holder 10 that include opposing convex sidewalls 112, the electrical forces acting on the droplets will be balanced out.

Figure 13:
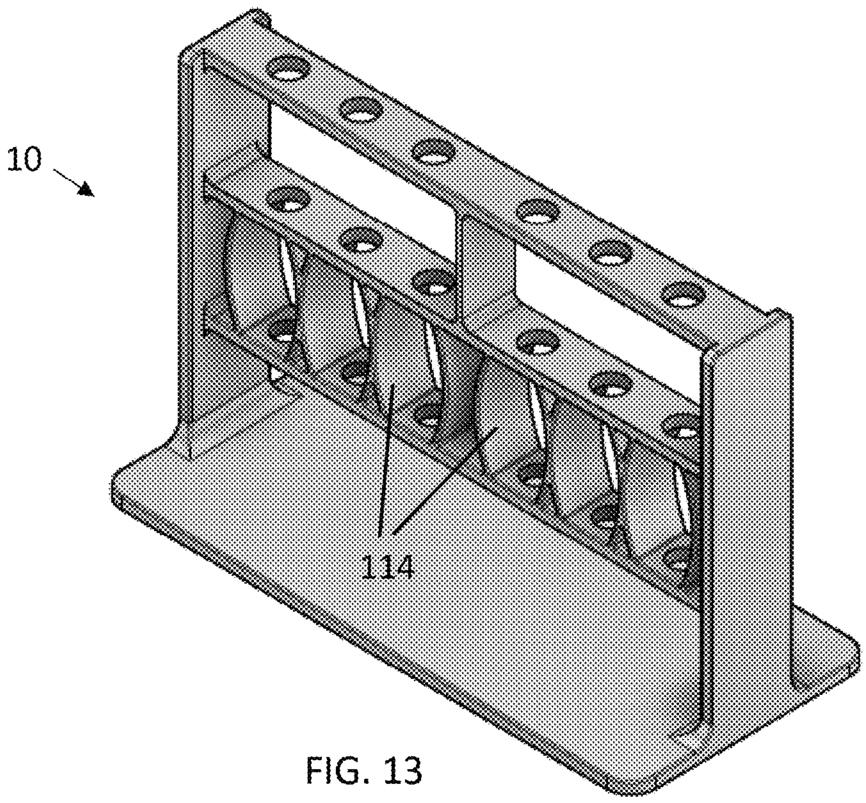
FIG. 13 illustrates a perspective view of a column tube holder with concave sidewalls, according to aspects of the present embodiments.
Figure 14:
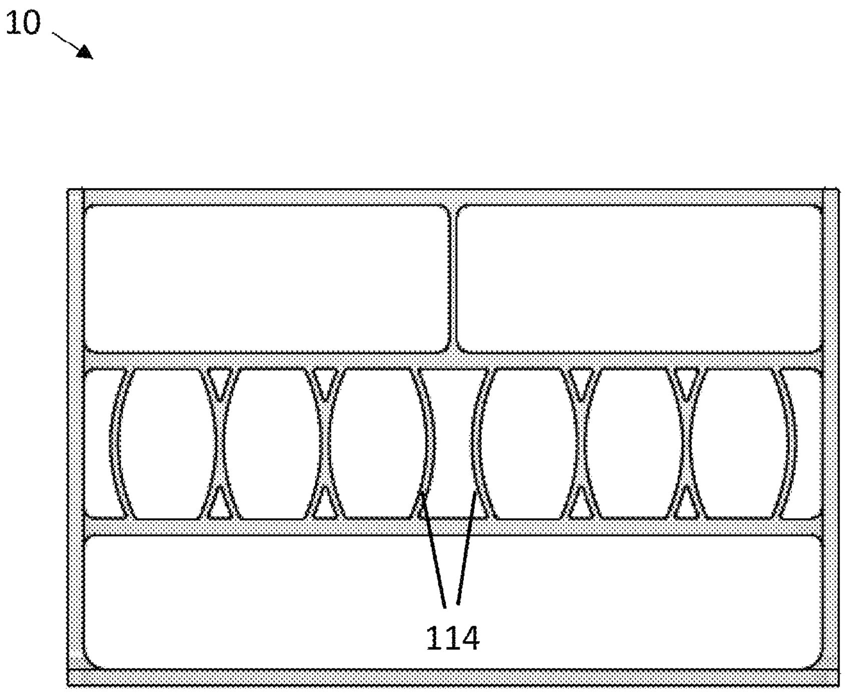
FIG. 14 illustrates a front view of a column tube holder with concave sidewalls, according to aspects of the present embodiments.

FIGS. 13 and 14 illustrate perspective and front views of a column tube holder 10 with concave sidewalls 114 respectively, according to aspects of the present embodiments. The concave sidewalls 114 are concave from the perspective of the centerline 54 and/or holes 26, 28. Similar to the convex sidewalls 112 of FIG. 12, for a given height, the centerline 54 is approximately equally spaced from each of the two opposing concave sidewalls 114, in the embodiments of FIGS. 13 and 14. In each of the embodiments of FIGS. 12-14, the convex and/or concave sidewalls 112, 114 may be desired in situations where the ratio ofviscous forces (for example, due to fluid properties of the analyte) to electrical forces (for example, due to environmental electrical charges and/or the ability of the analyte or droplets to carry a charge) may result in convex and/or concave sidewalls 112, 114 providing an enhanced ability to keep the droplets on or near the centerline 54 as they fall from the column tubes 80 to the receiving tubes 86 and/or polystyrene fluid reservoirs 96.

Figure 15:
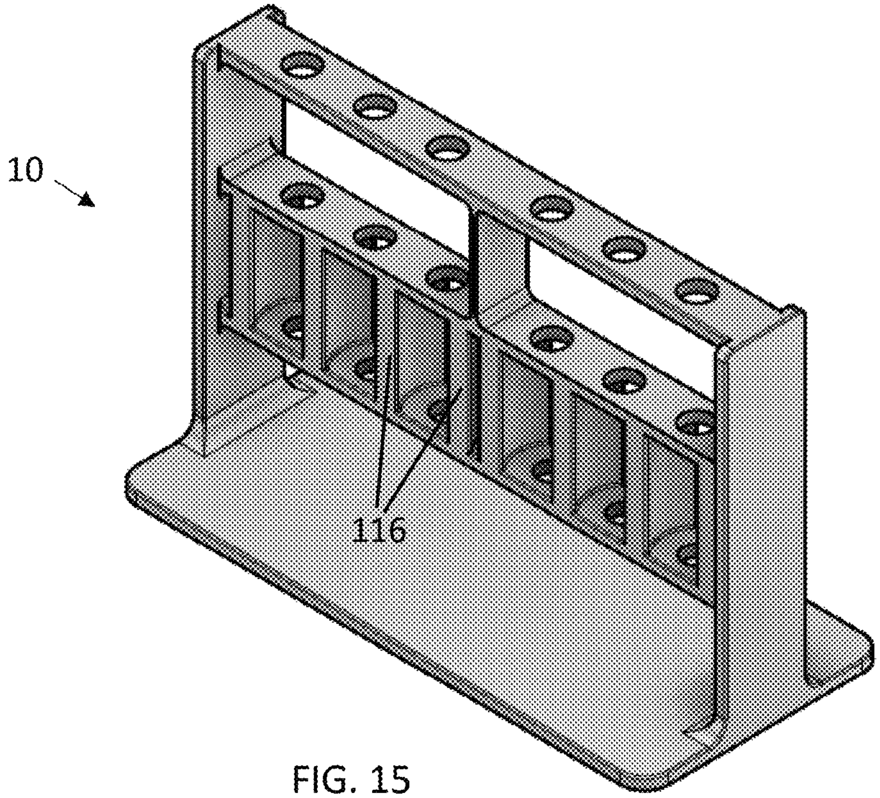
FIG. 15 illustrates a perspective view of a column tube holder including circular sidewalls, according to aspects of the present embodiments.

FIG. 15 illustrates a perspective view of the column tube holder 10 including circular sidewalls 116, according to aspects of the present embodiments. The circular sidewalls 116 may help to balance electrical forces acting on the droplets in both the lateral and longitudinal directions. In some embodiments, the circular sidewalls 116 may be concentric about the second holes 26 and/or the third holes (for example, in the plane defined by the second shelf 20 and/or the plane defined by the third shelf 22, respectively).

Figure 16:
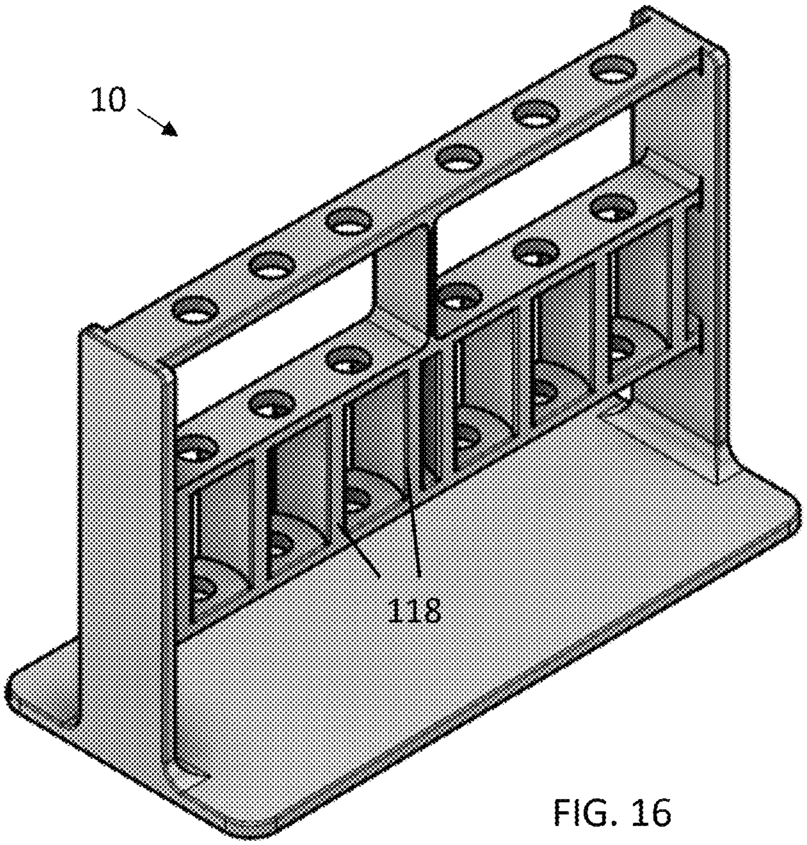
FIG. 16 illustrates a perspective view of a column tube holder including oval-shaped sidewalls, according to aspects of the present embodiments.

FIG. 16 illustrates a perspective view of the column tube holder 10 including oval-shaped (i.e., oval-shaped) sidewalls 118, according to aspects of the present embodiments. Similar to the circular sidewalls 116 of FIG. 15, the oval-shaped sidewalls 118 may help to balance electrical forces acting on the droplets in both the lateral and longitudinal directions. Whereas the circular sidewalls 116 of FIG. 15 may be located a constant distance from the respective second and/or third holes 26, 28, the distance from the ocular sidewalls 118 of FIG. 16 to the second and/or third holes 26, 28 may vary. Although both the circular sidewalls 116 and oval-shaped sidewalls 118 may include a constant radius of curvature, in some embodiments, the radius of curvature of the oval-shaped sidewalls 118 may be larger than that of the circular sidewalls 116.

Figure 17:
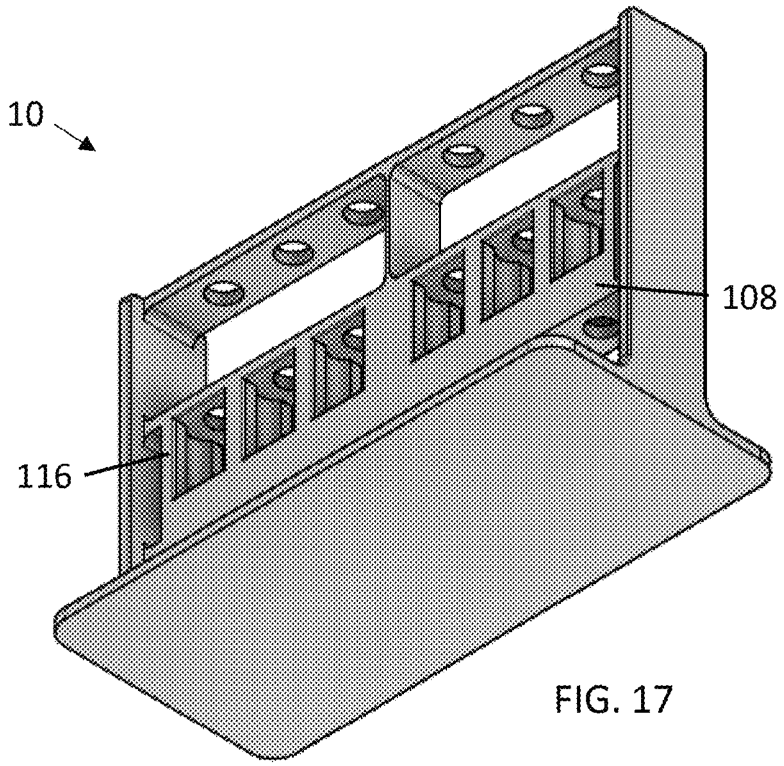
FIG. 17 illustrates a perspective view of the column tube holder including circular sidewalls and a partial bottom wall, according to aspects of the present embodiments.

FIG. 17 illustrates a perspective view of the column tube holder 10 including circular sidewalls 116 and a partial bottom wall 108, according to aspects of the present embodiments.

Figure 18:
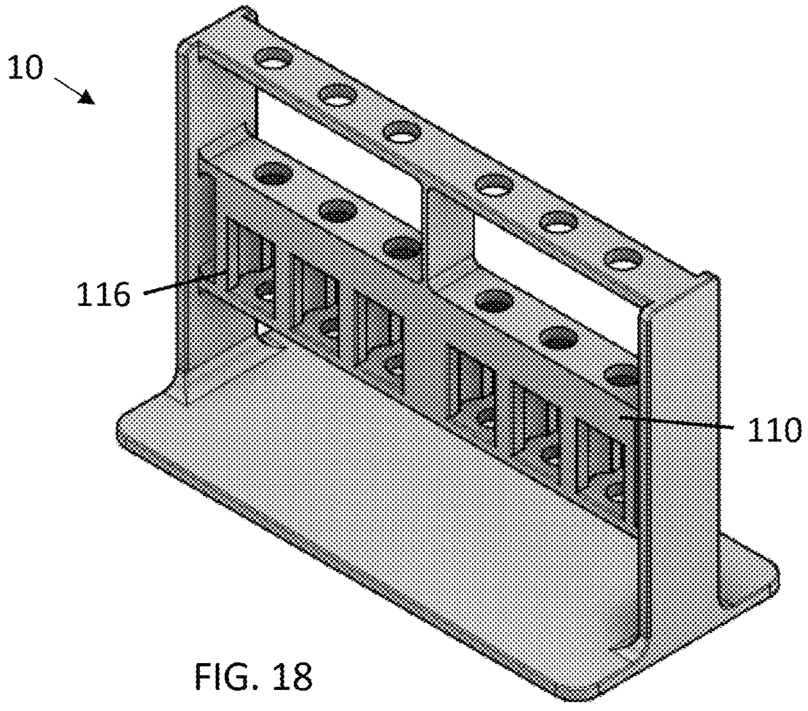
FIG. 18 illustrates a perspective view of the column tube holder including circular sidewalls and a partial top wall, according to aspects of the present embodiments.

FIG. 18 illustrates a perspective view of the column tube holder 10 including circular sidewalls 116 and a partial top wall 110, according to aspects of the present embodiments.

The dimensions of the column tube holder 10 may be adjusted to fit column tubes 80 (such as size exclusion columns) of almost any dimension. The column tube holder 10 be sized to hold column tubes 80 that include a total length in a range from about 30 mm to about 1000 mm, an inner width (or diameter) in a range from about 2.5 mm to about 250 mm, and/or an outer width (or diameter) in a range from about 3 mm to about 300 mm. The column tube holder 10 may include an overall height from about 100 mm to about 500 mm, or from about 150 mm to about 400 mm, or from about 200 mm to about 300 mm, or from about 200 mm to about 250 mm, or from about 175 mm to about 235 mm. The column tube holder 10 may include an overall width (i.e., in a lateral direction) from about 150 mm to about 2000 mm, or from about 150 mm to about 1000 mm, or from about 150 mm to about 800 mm, or from about 200 mm to about 600 mm, or from about 250 mm to about 500 mm, or from about 300 mm to about 400 mm, or from about 300 mm to about 350 mm, or from about 275 mm to about 375 mm. The column tube holder 10 may include a length (i.e., in a longitudinal direction) of from about 50 mm to about 400 mm, or from about 70 mm to about 350 mm, or from about 100 mm to about 300 mm, or from about 120 mm to about 200 mm, or from about 130 mm to about 180 mm, or from about 135 mm to about 175 mm. The column tube holder 10 may also include dimensions outside of and/or overlapping with the ranges disclosed herein, according to aspects of the present embodiments.

In each of the embodiments disclosed herein, the sidewalls 30, 108, 110, 114, 116, 118, in connection with the material of the column tube holder 10 (for example, conductive, anti-static, and/or static dissipative materials) act to balance out the electrical forces acting on the droplets of analyte such that the droplets may fall from the column tubes 80 into the collector tubes 86 or polystyrene liquid reservoirs without being attracted to, or adhering to, the sidewalls or any other structures of the column tube holder 10. By using conductive, anti-static, and/or static dissipative materials, any static charges may evenly spread (or in some embodiments, unevenly spread-out) across the surface of the column tube holder 10, rather than accumulating locally. The reduction in static charge buildup reduces the likelihood that droplets will move laterally during the fall into the collector tubes (or receiving tubes) 86 or polystyrene liquid reservoirs 96. As static electricity buildup decreases, the electric force field strength decreases. The reduction in electric field force, ultimately, decreases potential lateral movement from occurring as the droplet falls.

The use of conductive, anti-static, and/or static dissipative materials also makes it easier to ground the entire column tube holder 10 by simply electrically coupling a single location of the column tube holder 10 to ground. In addition, by placing equally-space sidewalls 30, 108, 110, 114, 116, 118 (or approximately evenly spaced sidewalls) on opposing sides of the respective centerlines, the net electrical force acting on the droplets can be substantially balanced, thereby allowing the droplets to fall vertically downward. The equidistant sidewalls 30, 108, 110, 114, 116, 118 also help to prevent potential splashing of sample into other containers (for example, adjacent collector tubes 86) caused by the droplets during the droplet-landing process.

The column tube holder 10 of the present embodiments may be used in many potential applications including but not limited to molecular and/or droplet size exclusion, any gravity-based chromatographic separation, affinity chromatography, ion-exchange chromatography, hydrophobic interaction chromatography, immobilized metal affinity chromatography, as well as other potential applications.

Experimental Results

A column tube holder 10 was constructed of aluminum, according to aspects of the present embodiments. Each of sidewalls 30 were equidistant from each of the respective centerlines 54. The diverted or blocked electrical fields acting laterally on the droplets were “confirmed” experimentally. A 12-volt charge and a 0-volt charge were applied to the aluminum column tube holder 10. The relatively large amount of voltage (i.e., 12 volts) was intended to generate an electric field that would be much greater than what would occur naturally in a lab environment. For both the 12-vote and 0-volt cases, zero or almost zero lateral movements were observed while the droplets were falling from the column tubes 80 to the receiving tubes 86. The lack of lateral movement suggests that using an aluminum material with sidewalls 30 that are equidistant to each respective centerline 54 sufficiently prevents lateral movement of the droplets caused from electric force fields generated from very high environmental voltages (which were distributed across the column tube holder). None of the sidewalls 30 needed to be offset to account for a potential electric field generated by the side rails 14, 16, or other structures. However, when other materials are used for the column tube holder 10, and/or when the droplets include other compositions, offsetting the sidewalls 30 may be desired. A 12-volt charge was also applied to phosphate-buffered saline (PBS) in the column tubes 80, thereby ensuring there was a charge applied to the falling droplets. Even with the relatively high voltage applied to the liquid solution, no lateral movement was observed as the droplets fell between the parallel sidewalls.

Elements of different implementations described may be combined to form other implementations not specifically set forth previously. Elements may be left out of the processes described without adversely affecting their operation or the operation of the system in general. Furthermore, various separate elements may be combined into one or more individual elements to perform the functions described in this specification.

Other implementations not specifically described in this specification are also within the scope of the following claims.

These and other features, aspects and advantages of the present embodiments will become better understood with reference to the following description and appended claims. The accompanying drawings, which are incorporated in and constitute a part of this specification, illustrate embodiments of the present disclosure and, together with the description, serve to explain the principles of the present embodiments.

Certain Definitions

In order for the present disclosure to be more readily understood, certain terms are first defined below. Additional definitions for the following terms and other terms are set forth throughout the specification.

An apparatus, system, or method described herein as "comprising" one or more named elements or steps is open-ended, meaning that the named elements or steps are essential, but other elements or steps may be added within the scope of the apparatus, system, or method. To avoid prolixity, it is also understood that any apparatus, system, or method described as "comprising" (or which "comprises") one or more named elements or steps also describes the corresponding, more limited apparatus system, or method "consisting essentially of" (or which "consists essentially of") the same named elements or steps, meaning that the apparatus, system, or method includes the named essential elements or steps and may also include additional elements or steps that do not materially affect the basic and novel characteristic(s) of the system, apparatus, or method. It is also understood that any apparatus, system, or method described herein as "comprising" or "consisting essentially of" one or more named elements or steps also describes the corresponding, more limited, and closed-ended apparatus, system, or method "consisting of" (or "consists of") the named elements or steps to the exclusion of any other unnamed element or step. In any apparatus, system, or method disclosed herein, known or disclosed equivalents of any named essential element or step may be substituted for that element or step.

As used herein, the term "longitudinally" generally refers to the direction oriented from the front of the column tube holder to the back of the column tube holder, and/or from the back of the column tube holder to the front of the column tube holder.

As used herein, the term "laterally" generally refers to the direction oriented from the left side of the column tube holder to the right side of the column tube holder, and/or from the right side of the column tube holder to the left side of the column tube holder.

As used herein, the terms "collector tube" and "receiving tubes" may be used synonymously.

As used herein, the terms "equidistant" and "equally spaced" in the context of the distances between a centerline and the surrounding opposing sidewalls can mean that the respective distances between each sidewall and the centerline differ by no more than 1%.

As used herein, the term "about" used in the context of a number, dimension, variable, or parameter generally refers to +/−1% and/or within the measurement uncertainty, whichever is larger.

As used herein, "a" or "an" with reference to a claim feature means "one or more," or "at least one."

As used herein, the term "substantially" refers to the qualitative condition of exhibiting total or near-total extent or degree of a characteristic or property of interest.

EQUIVALENTS

It is to be understood that while the disclosure has been described in conjunction with the detailed description thereof, the foregoing description is intended to illustrate and not limit the scope of the disclosed embodiments. Other aspects, advantages, and modifications are within the scope of the claims.

This written description uses examples to disclose the present embodiment, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A column tube holder comprising:

a first side rail extending vertically;

a second side rail extending vertically;

a first rack extending horizontally between the first side rail and the second side rail, the first rack comprising at least one first hole disposed therethrough;

a second rack extending horizontally between the first side rail and the second side rail, the second rack disposed below the first rack, the second rack comprising at least one second hole disposed therethrough;

a third rack extending horizontally between the first side rail and the second side rail, the third rack disposed below the second rack, the third rack comprising at least one third hole disposed therethrough;

at least two sidewalls extending vertically between the second rack and the third rack, each sidewall of the at least two sidewalls disposed on opposing sides of the at least one third hole, each sidewall not extending above the second rack or below the third rack, wherein the at least one first hole, the at least one second hole, and the at least one third hole are vertically aligned.

2. The column tube holder of claim 1, wherein each sidewall of the at least two sidewalls are substantially planar.

3. A system for holding column tubes comprising:

a column tube holder comprising: a first side rail extending vertically;

a second side rail extending vertically;

a first rack extending horizontally between the first side rail and the second side rail, the first rack comprising a first plurality of holes disposed therethrough;

a second rack extending horizontally between the first side rail and the second side rail, the second rack disposed below the first rack, the second rack comprising a second plurality of holes disposed therethrough; and a third rack extending horizontally between the first side rail and the second side rail, the third rack disposed below the second rack, the third rack comprising a third plurality of holes disposed therethrough;

a plurality of sidewalls vertically extending between the second rack and the third rack, each sidewall not extending above the second rack or below the third rack; and at least one column tube disposed within at least one hole of the first plurality of holes and at least one hole of the second plurality of holes, and wherein the first plurality of holes, the second plurality of holes, and the third plurality of holes are vertically aligned.

4. The system of claim 3, further comprising:

at least one receiving container disposed beneath the third rack wherein liquid droplets from the at least one column tube are configured to drop between at least two of the plurality of sidewalls into the at least one receiving container.

5. The system of claim 4, wherein the at least one receiving container comprises at least one of a collector tube and a polystyrene liquid reservoir.

6. The system of claim 3, further comprising:

a first section comprising a first column tube holder;

a second section comprising a second column tube holder and hingedly coupled to the first section; and a third section comprising a third column tube holder and hingedly coupled to the second section.

* * * * *